(12) United States Patent
Yoshida et al.

(10) Patent No.: US 7,239,643 B2
(45) Date of Patent: Jul. 3, 2007

(54) METHOD FOR ASSIGNING SETTING INFORMATION FOR CONNECTION TO EXTERNAL NETWORK

(75) Inventors: Takeo Yoshida, Nakano-ku (JP); Naoki Yamada, Nakano-ku (JP); Fumio Kitagawa, Nakano-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1113 days.

(21) Appl. No.: 10/224,399

(22) Filed: Aug. 21, 2002

(65) Prior Publication Data

US 2003/0123463 A1 Jul. 3, 2003

(30) Foreign Application Priority Data

Dec. 27, 2001 (JP) ............................. 2001-398340

(51) Int. Cl.
*H04L 12/28* (2006.01)
*H04L 12/56* (2006.01)
(52) U.S. Cl. .................. 370/401; 370/395.54; 370/351
(58) Field of Classification Search .................... None
See application file for complete search history.

(56) References Cited

U.S. PATENT DOCUMENTS

| 5,982,869 | A | * | 11/1999 | Lozano et al. ......... 379/220.01 |
| 6,104,870 | A | | 8/2000 | Frick et al. |
| 6,223,222 | B1 | * | 4/2001 | Fijolek et al. ............... 709/227 |
| 6,542,934 | B1 | * | 4/2003 | Bader et al. ................. 709/239 |
| 6,847,649 | B2 | * | 1/2005 | Sutanto ....................... 370/401 |

FOREIGN PATENT DOCUMENTS

| CN | 1243370 A | 2/2000 |
| EP | 0 973 300 A2 | 1/2000 |
| JP | A 2000-174824 | 6/2000 |
| KR | 10-0310652 | 2/2000 |

OTHER PUBLICATIONS

Ralph Droms; "Automated Configuration of TCP/IP with DHCP", IEEE Internet Computing, vol. 3, Issue 4, pp. 45-53, Jul.-Aug. 1999.
English language version of Korean Office Action dated Sep. 24, 2004.

* cited by examiner

*Primary Examiner*—Chi Pham
*Assistant Examiner*—Ronald Abelson
(74) *Attorney, Agent, or Firm*—Oliff & Berridge, PLC

(57) ABSTRACT

A method for assigning setting information to a client suitably distributes clients among gateways which are used for connection to an external network. A server assigns gateways to each client in order such that the load placed onto the gateways can be distributed. When a request for extension of use is received from a client A which uses GW1 after a failure has occurred in GW1, the server assigns GW2 which is available. In this process, a lease period is set at a shorter time than the base lease period. When a request for extension of use is received from the client A after GW1 is restored, the server returns the gateway to be used to GW1.

5 Claims, 13 Drawing Sheets

ADDRESS CORRESPONDENCE TABLE

| MAC ADDRESS | IP ADDRESS | BASE GW ADDRESS | EMPLOYED GW ADDRESS |
|---|---|---|---|
| P | X | GW1 | GW1 |
| Q | Y | GW2 | GW2 |
| R | Z | GW2 | GW1 |
| ⋮ | ⋮ | ⋮ | ⋮ |

Fig. 2

ADDRESS CORRESPONDENCE TABLE

| MAC ADDRESS | IP ADDRESS | SERVER ADDRESS | BASE GW ADDRESS | EMPLOYED GW ADDRESS |
|---|---|---|---|---|
| M1 | IP1 | SA | GW1 | GW1 |
| M2 | IP10 | SB | GW2 | GW2 |
| M5 | IP11 | SA | GW3 | GW1 |
| ...... | ...... | ...... | ...... | ...... |

Fig. 6

COORDINATOR LIST TABLE

| COORDINATOR SERVER |
|---|
| SA |
| SB |
| SC |

Fig. 7

METHOD FOR ASSIGNING SETTING INFORMATION FOR CONNECTION TO EXTERNAL NETWORK

BACKGROUND OF THE INVENTION

1. Field of the Invention

The present invention relates to improvements in availability of network communication in a client-server system which is connectable to an external network, such as the Internet.

2. Description of the Related Art

FIG. 13 shows a basic structure of a network system constructed as a client-server system in which access to the Internet is enabled. FIG. 13 shows a structure wherein a gateway (GW) 4 connected to the Internet 1 via a communication channel 3, a DHCP (Dynamic Host Configuration Protocol) server 5, and one or a plurality of clients 6 which access the Internet 1 are connected to a LAN (Local Area Network) 7.

With this structure, when a client 6 accesses the Internet 1, the client 6 transmits an IP address assignment request to the DHCP server 5. In response to the IP address assignment request, the DHCP server 5 assigns an IP address to the client 6 and returns the assigned IP address with the known address of the gateway 4. Based on the information sent from the DHCP server 5, the client 6 identifies a gateway 2 to which the client 6 requests connection to the Internet 1 and accesses the Internet 1 via the gateway 4 and the communication channel 3 using the IP address assigned by the DHCP server 5.

There is a general trend in recent years that the number of clients 6 connected to one LAN 7 is increasing. As the number of connected clients 6 increases, the load placed on each device also increases. In order to handle the increased load, a network administrator may attempt to, for example, strengthen the communication capability by, for example, employing a lease line as the communication channel 3, improving the processing capability of the server 5 and/or gateway 4, or setting various proxy servers. Alternatively, the network administrator may divide the LAN 7 into segments and provide a communication channel 3, gateway 4, and server 5 as shown in FIG. 13 separately for each segment of the divided LAN.

The process for the client 6 to obtain an IP address and address of the gateway 4 will now be described for a system structure wherein a plurality of gateways 4 and DHCP servers 5 are connected to a LAN 7.

A client 6 which has not yet obtained an IP address broadcasts a DHCPDISCOVER message. All DHCP servers 5 receive this message, and, among the DHCP servers 5, one or more DHCP servers 5 which are programmed to respond to the client 6 return a DHCPOFFER message to the client 6. The DHCPOFFER message includes information such as the IP address to be assigned, the address of the gateway 4, and the lease period of the IP address. The client 6 collects the response DHCPOFFER messages from the DHCP servers 5 and selects one of the DHCPOFFER messages. The client 6 then transmits a DHCPREQUEST message to the corresponding DHCP server 5. In response to the received DHCPREQUEST message, the DHCP server 5 responds by transmitting a DHCPACK so that lease of the IP address can be started. In this manner, the client 6 can access the Internet 1 using the assigned IP address and gateway 4.

In DHCP, a lease period for an IP address is set by the DHCP server 5 and the IP address cannot be used beyond the expiration of the lease period. Because the DHCP server 5 has the authority to control the lease, a client 6 which wishes to continue accessing the Internet 1 requests extension of lease to the leasing DHCP server by transmitting a DHCPREQUEST message. If the DHCP server 5 accepts continuation of use, the DHCP server 5 transmits a DHCPACK in response to the received DHCPREQUEST message. In this manner, the client 6 can continue to use the assigned IP address and gateway 4 to access the Internet 1.

If, on the other hand, the DHCP server 5 rejects the continued use of the IP address, the DHCP server 5 transmits a DHCPNACK. When the client 6 receives the DHCPNACK, because the client 6 cannot use, after the lease period is expired, the IP address which is being used, the client 6 returns to its initial state, that is, the state before the IP address is obtained. Therefore, the client 6 again broadcasts the DHCPDISCOVER message as described above and obtains an IP address.

When there is no response from the leasing DHCP for the transmitted DHCPREQUEST, the client 6 assumes that the DHCP server 5 is either suspended or in a unreachable state, and broadcasts a DHCPREQUEST message. In this manner, the client 6 obtains an IP address and an address of the gateway from another DHCP server 5.

However, in the conventional art, because the minimum length of the lease period which is set by the DHCP server is set at 1 hour, a length of 1 hour or more is set for all clients and a uniform lease period is set regardless of the gateway to be used. Because of this, although when a certain gateway is suspended by a failure occurring in the gateway, another available gateway connects the client and the Internet in place of the suspended gateway, even when the suspended gateway is restored, the client cannot change the gateway to be used back to the original gateway. That is, when, for example, the DHCP server uniformly distributes the clients to each gateway in consideration of the load distribution, in a case wherein a certain gateway is suspended and is later restored, the load is concentrated to the substituting gateway as long as the client continues to use the IP address, even when the suspended gateway is restored.

SUMMARY OF THE INVENTION

The present invention was conceived to solve the above described problem and an object of the present invention is to provide a method for assigning setting information such that clients can be appropriately distributed among gateways used for connection to an external network.

In order to achieve at least this object, according to one aspect of the present invention, there is provided a method for assigning setting information in response to an assignment request from a client to be connected to an external network via one of a plurality of gateways, the method executed by a DHCP server and the setting information including at least locating information of the gateway, the method comprising the steps of analyzing the received assignment request from the client, and producing and assigning to the client which transmitted the assignment request, when connection to the external network via a base gateway which is already assigned as a gateway to be used in normal cases is not possible, setting information including identification information of an alternative gateway different from the base gateway and a lease period which is shorter than a base lease period for address for communication which is set along with the base gateway.

According to another aspect of the present invention, it is preferable that, the method for assigning setting information further comprises a reassignment step for producing and assigning to the client which transmitted the assignment request, when the client is using the alternative gateway and the communication route to the external network via the base gateway assigned to the client is restored, setting information which includes identification information of the base gateway and base lease period.

According to yet another aspect of the present invention, it is preferable that the method for assigning setting information further comprises the step of transmitting to the client the setting information assigned to the client.

According to the present invention, because the method is configured so that a substitute gateway is assigned to a client when the base gateway to be normally used becomes unavailable, a continuous connection of the client with the external network can be maintained.

Also, because the method is configured so that the gateway used by the client is changed back from the substitute gateway to the base gateway when the base gateway is restored and again becomes available, it is possible to maintain the load distribution when the assignment of the base gateway is performed in consideration of the load distribution among the gateways.

Moreover, because the lease period when the substitute gateway is used is set at a short time, it is possible to more quickly return to the base gateway when the base gateway is restored.

BRIEF DESCRIPTION OF THE DRAWINGS

FIG. 2 is a diagram showing an example data structure of an address correspondence table according to a first embodiment of the present invention.

FIG. 6 is a diagram showing an example data structure of an address correspondence table according to a third embodiment of the present invention.

FIG. 7 is a diagram showing an example data structure of a coordinator list table according to the third embodiment.

DESCRIPTION OF PREFERRED EMBODIMENTS

Figure 1:
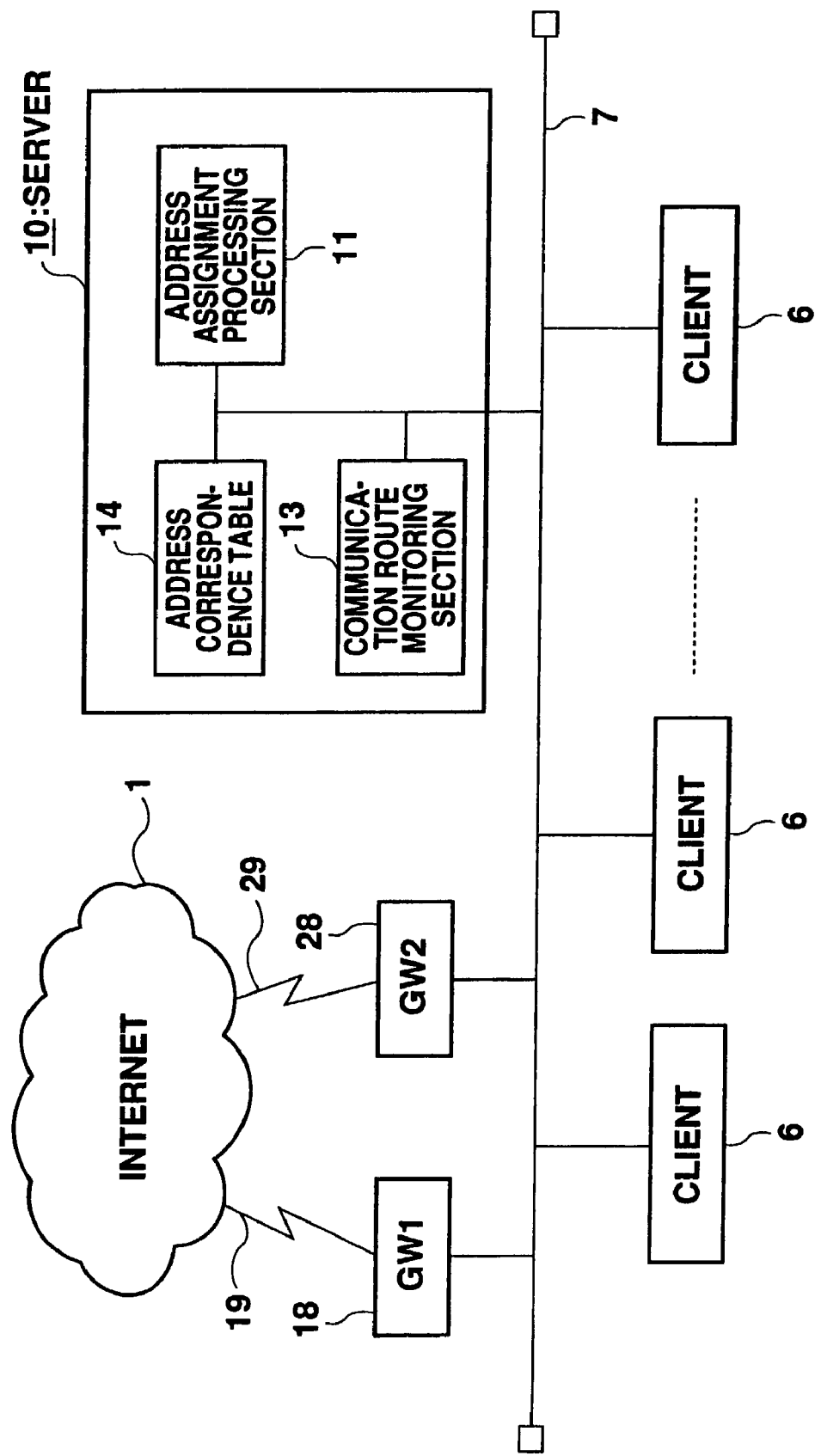
FIG. 1 is a structural block diagram showing a client-server system for practicing a method for assigning setting information for connection to an external network according to the present invention.

The preferred embodiments of the present invention will not be described referring to the drawings. In the description of the preferred embodiments, structures identical to those in the conventional art described above are assigned the same reference numerals.

First Embodiment

FIG. 1 is a structural block diagram showing a client-server system for practicing a method for assigning setting information for connection to an external network. The client-server system in the first embodiment comprises a server 10, two gateways 18 and 28, and a plurality of clients 6, all connected to a LAN 7. Each component in the client-server system other than the server 10 may be identical to those in the conventional art. Each client 6 can access the Internet 1 via one of the gateways 18 and 28. The client 6 may be any device which has general-purpose functions as a DHCP client and does not require any specific function to operate according to the first embodiment.

The server 10 is a server having functions equivalent to those of the conventional DHCP server and includes a processing function to dynamically assign an IP address corresponding to DHCP. However, as will be described below, the assignment process of the IP address of the server 10 differs from that of the conventional DHCP server. The server 10 according to the first embodiment comprises an address assignment processing section 11, a communication route monitoring section 13, and an address correspondence table 14. The address assignment processing section 11 has a function corresponding to a DHCP server and executes an address assignment process in which an IP address or the like is assigned to a client 6 in response to an IP address assignment request from the client 6. The communication route monitoring section 13 monitors the conditions (whether or not connection is possible) of a network route formed via a gateway 18 and a communication channel 19 or a network route formed via a gateway 28 and a communication channel 29, which is routed through when the client 6 accesses the Internet 1.

FIG. 2 shows an example data structure of the address correspondence table 14 employed in the first embodiment. As shown, the address correspondence table 14 stores address correspondence information in which a MAC address, an IP address, a base GW address, and an employed GW address are correlated. The MAC address is uniquely assigned to each client 6 and is an address for distinguishing the client. The IP address is an address for communication which is dynamically assigned for the client 6. The base GW address is the address of gateway 18 or gateway 28 which is newly assigned to a client 6 which has not obtained an IP address, and can be considered as the initial value in each client 6. The employed GW address is the address of the gateway which is actually being used by the client 6 at that time.

The first embodiment is characterized in that the initiative for the determination of the IP address and the gateway 18 or 28 to be used by the client 6 is placed on the server side. This characteristic address assignment process will now be described referring to a sequence diagram shown on FIG. 3.

Figure 3:
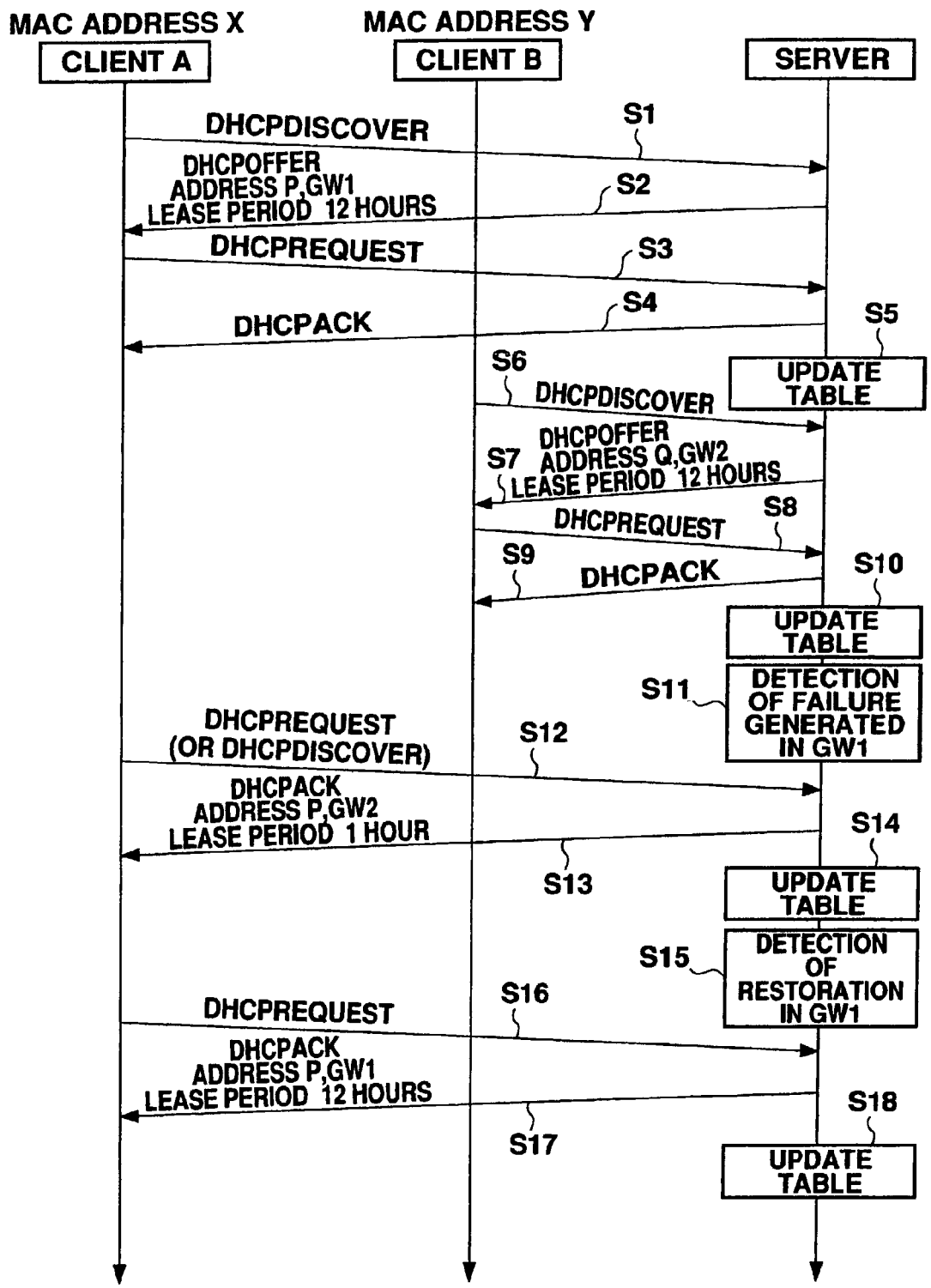
FIG. 3 is a diagram showing a communication sequence between a server and two clients according to the first embodiment of the present invention.

FIG. 3 shows a communication sequence between a server 10 and two clients 6. The MAC addresses of the clients A and B are respectively X and Y, and it is assumed that neither has yet obtained an IP address.

Because the client A must obtain an IP address in order to access the Internet 1, the client A transmits an IP address assignment request (a DHCPDISCOVER message) to the server 10 (step S1). In reality, this message is broadcast, but because there is only one server in this example case, only the server 10 receives the message. The address assignment processing section 11 of the server 10 checks whether or not an IP address is assigned to the client A by referring to the address correspondence table 14 and based on the MAC address X of the client A contained in the IP address assignment request. In this example process, because an IP address has not yet been obtained, the address assignment processing section 11 finds a non-assigned IP address which is not registered in the address correspondence table 14 and assigns the IP address to the client A. Further, the address assignment processing section 11 determines one gateway from the two gateways GW1 and GW2 to be used by the client A. The address assignment processing section 11 also obtains a base lease period (default value) as the lease period for the IP address. In this manner, setting information is produced which includes the obtained IP address, GW address as the connection information, and lease period. The produced setting information (DHCPOFFER message) is then transmitted to the client A (step S2). In FIG. 3, an example case is shown wherein setting information is transmitted indicating that an IP address P is assigned to the client A, GW1 is to be used, and lease period is set at 12 hours (base lease period). The period in which the setting information assigned to the client 6 is effective (assignment period) is identical to the lease period of the IP address set in the setting information.

In response to the DHCPOFFER message sent from the server 10, the client A transmits a DHCPREQUEST message to identify the server 10 according to the DHCP (step S3). In response to the transmitted DHCPREQUEST message, the server 10 returns a DHCPACK in order to start leasing the IP address (step S4). In this manner, the client A can access the Internet 1 using the assigned IP address and gateway 18. In addition, after transmitting the DHCPACK, the server 10 sets the address of the gateway 18 assigned through the above process both as the base GW address and as the employed GW address in the address correspondence table 14 (step S5).

Similarly, the address assignment processing section 11 permits the client B to start accessing the Internet 1 through processes identical to those for the client A (steps S6-S10) with an exception that setting information differing from that for the client A is produced. In other words, a different IP address Q is assigned, and, at the same time, GW2 is assigned as the gateway to be used for the client B which is to be assigned an IP address following the client A, because the address assignment processing section 11 operates to assign the gateways 18 and 28 in sequence for the clients 6 transmitting an assignment request. Therefore, GW2 which follows GW1 is assigned to the client B. In this manner, the clients 6 can be approximately uniformly distributed among the gateways 18 and 28, resulting in corresponding approximate uniform distribution of the load placed onto the gateways 18 and 28. Here, the lease period for the client B is set at the base lease period (12 hours).

Now assume that the communication route monitoring section 13 of the server 10 has detected that a failure is generated in the gateway 18 (step S11). More precisely, the communication route monitoring section 13 detects that connection to the Internet 1 via the gateway 18 is impossible, perhaps due to, for example, fault of the gateway 18 itself or disconnection of the communication channel 19.

Then, when a DHCPREQUEST message is transmitted from the client A for requesting an extension of the use of the IP address, or, alternatively and not shown in FIG. 3, when a DHCPDISCOVER message is transmitted to obtain an IP address again after the use is once terminated (step S12), the address assignment processing section 11 must produce setting information in response to the assignment request. When an assignment request for extension of use is received, if the gateway 18 assigned for the client A is functioning normally, the address assignment processing section 11 obtains the IP address and the address of gateway 18 which are already assigned to the client A by referring to the address correspondence table 14, produces setting information including the IP address, GW address, and lease period, and transmits the setting information to the client A. However, as in this example case, if the gateway 18 is suspended, the address assignment processing section 11 produces setting information by obtaining information as follows. First, as the IP address, the address assignment processing section 11 obtains, from the address correspondence table 14, the IP address which is already assigned. The address assignment processing section 11 obtains the address of GW2 which is functioning normally as the gateway which is to function as the network route to the Internet 1. Finally, as the lease period, the address assignment processing section 11 sets a shorter period than the base lease period (for example, 1 hour). The address assignment processing section 11 thus produces setting information including these information and transmits the setting information to the client A (step S13). In this manner, because the server 10 switches the gateway to another available gateway, GW2, the client A can continue to access the Internet 1 even when a failure is generated in GW1 which is assigned to the client A. Similarly, in the case of re-acquisition of the IP address, the client A can start accessing the Internet 1 without being affected by the failure in GW1.

After the transmission of the setting information is completed, the address assignment processing section 11 updates the employed GW address for the client A which is set in the address correspondence table 14 from GW1 to GW2 (step S14).

Then, after the communication route monitoring section 13 of the server 10 detects that the gateway 18 is restored (step S15), when the client A transmits a DHCPREQUEST message for requesting extension of use of the IP address (step S16), the address assignment processing section 11 produces setting information in response to the assignment request in the following manner. That is, because the gateway 18 which is the base GW address assigned to the client A is normally operating, the address assignment processing section 11 obtains the IP address and the base GW address by referring to the address correspondence table 14, produces setting information including the obtained IP address, GW address, and the base lease period as the lease period, and transmits the setting information to the client A (step S17) Then, the address assignment processing section 11 updates the employed GW address of the client A which is set in the address correspondence table 14 from GW2 to GW1 (step S18)

As described, according to the first embodiment, when an extension of use is requested while the Internet 1 cannot be accessed via the gateway 18 originally assigned to the client A, it is possible to continue the use by assigning GW2, and when GW1 is restored and an extension of use is requested, the assigned gateway is returned to GW1 instead of continuing to use GW2. As already described, during the initial setting, the server assigns GW1 to the client A in consideration of the load distribution. Therefore, if GW1 is already restored when an extension of use is requested, by returning the gateway to be used to the original GW1, it is possible to maintain the distribution of the load placed onto the gateways 18 and 28. In this manner, in this first embodiment, the gateways 18 and 28 originally assigned to the clients 6 in consideration of the distribution of the load are set as the base gateway, and the gateway to be used when the base gateway cannot be used because of a failure, for example, is considered a substitute gateway during the period wherein the failure is present.

Moreover, in the first embodiment, the lease period set in the setting information along with the substitute gateway is set at a shorter period than the base lease period. In this manner, when the base gateway is restored, the gateway to be used can quickly be returned to the base gateway, and, thus, it is possible to shorten the time in which the load is not uniform. In order to more efficiently obtain this advantage, it is desirable to shorten the lease period to be set along with the substitute gateway in the setting information. Therefore, in the first embodiment, the lease period for the substitute gateway is set at 1 hour which is the minimum time duration that can be set. However, the first embodiment is not limited to such a configuration and a lease period other than 1 hour can also be employed.

Second Embodiment

Figure 4:
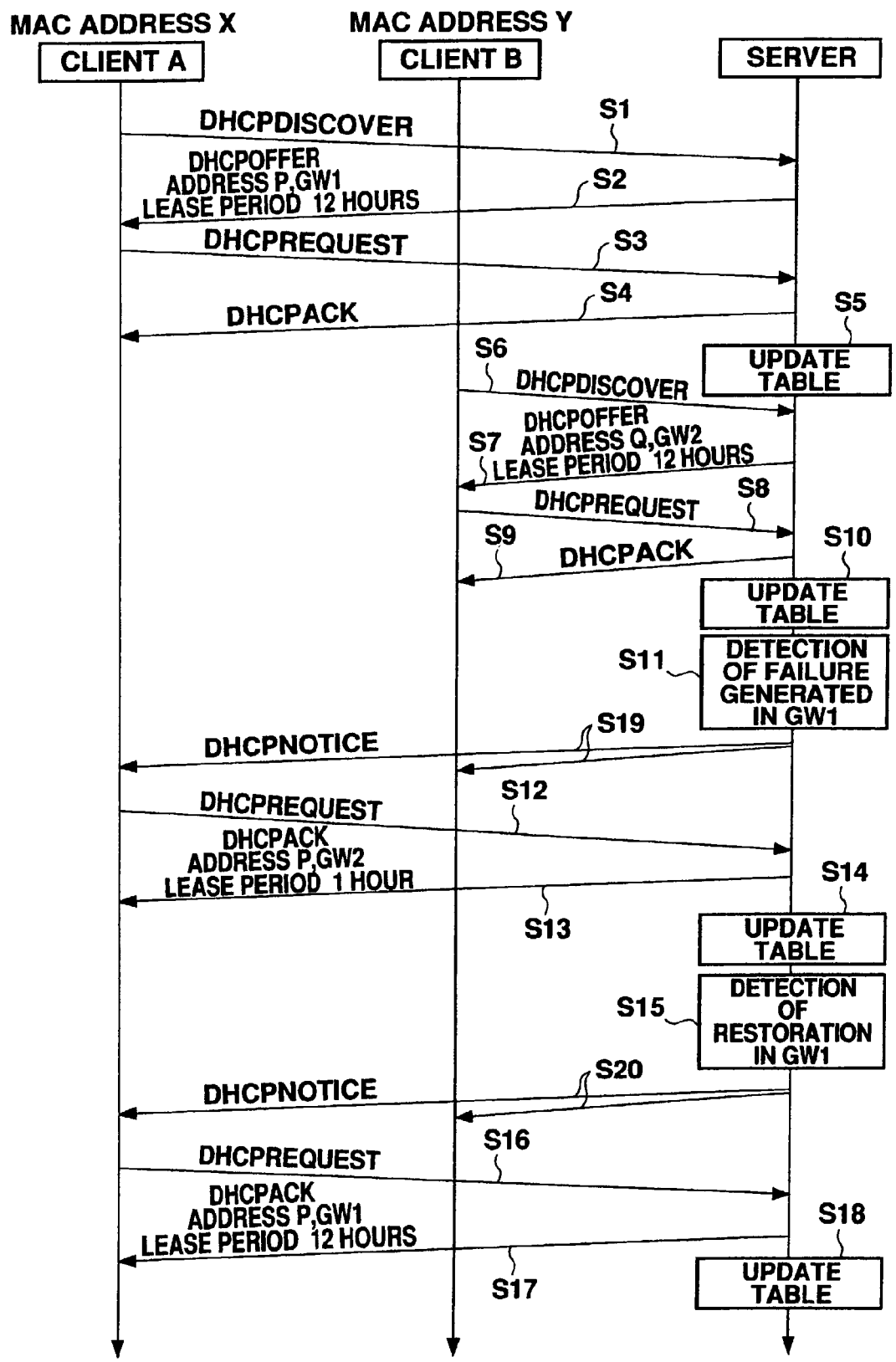
FIG. 4 is a diagram showing a communication sequence between a server and two clients according to a second embodiment of the present invention

FIG. 4 is a diagram showing a communication sequence between a server and two clients in a second embodiment of the present invention. In FIG. 4, the processes identical to those shown in FIG. 3 are assigned the same reference numerals and, in general, will not be further described.

In the above described first embodiment, when GW1 cannot be used because of a fault or the like, the client A transmits DHCPREQUEST message (assignment request) near the lease period (more precisely, when 50% of the lease period has expired) (step S12), and until this transmission of the assignment request, an error is generated when the client A attempts to access the Internet 1. Therefore, some countermeasure must be employed. In consideration of this, the second embodiment is characterized in that when the communication route monitoring section 13 detects that a failure is generated in the gateway 18 (step S11), this occurrence of failure is notified to the client 6.

More specifically, the address assignment processing section 11, upon detecting a failure in the gateway 18, broadcasts the detection of failure to the clients 6 (step S19). Because no message is provided in the DHCP for this broadcast, in this example case showing the second embodiment, this broadcast is executed using a DHCPNOTICE message. Although in this example case, the DHCPNOTICE message is broadcast, because the clients 6 which are using GW1 are clear from the employed GW address in the address correspondence table 14, it is also possible to employ a configuration wherein this message is transmitted only to the individual corresponding clients 6.

The client A to which GW1 was assigned, upon receiving the DHCPNOTICE message, transmits a DHCPREQUEST message (assignment request) regardless of the elapsed time of the lease period (step S12). Then, GW2 is assigned according to the procedures described above for the first embodiment so that the client A can continue to access the Internet 1 as before the extension of the use of the same IP address (step S13).

Then, when the communication route monitoring section 13 detects that the gateway 18 is restored (step S15), the address assignment processing section 11 broadcasts a DHCPNOTICE message indicating the restoration (step S20). Similar to when a failure is generated, it is also possible to configure such that individual message is transmitted only to the clients 6 in which the base GW address is GW1 and the employed GW address is not GW1 by referring to the address correspondence table 14.

A client A in which the base GW address is GW1 and the employed GW address is not GW1, upon receiving the DHCPNOTICE message, transmits a DHCPREQUEST message (assignment request) regardless of the elapsed time in the lease period (step S16). Then, according to the procedures described above for the first embodiment, the gateway to be used can be returned to GW1 which is the base GW address (step S17).

According to the second embodiment, by using the DHCPNOTICE message, it is possible to switch between the gateways 18 and 28 to be used immediately after the connection to the Internet 1 becomes not possible via the gateway 18 or 28 which is being used. Similarly, it is possible to immediately return to the base gateway when the base gateway is restored.

Third Embodiment

Figure 5:
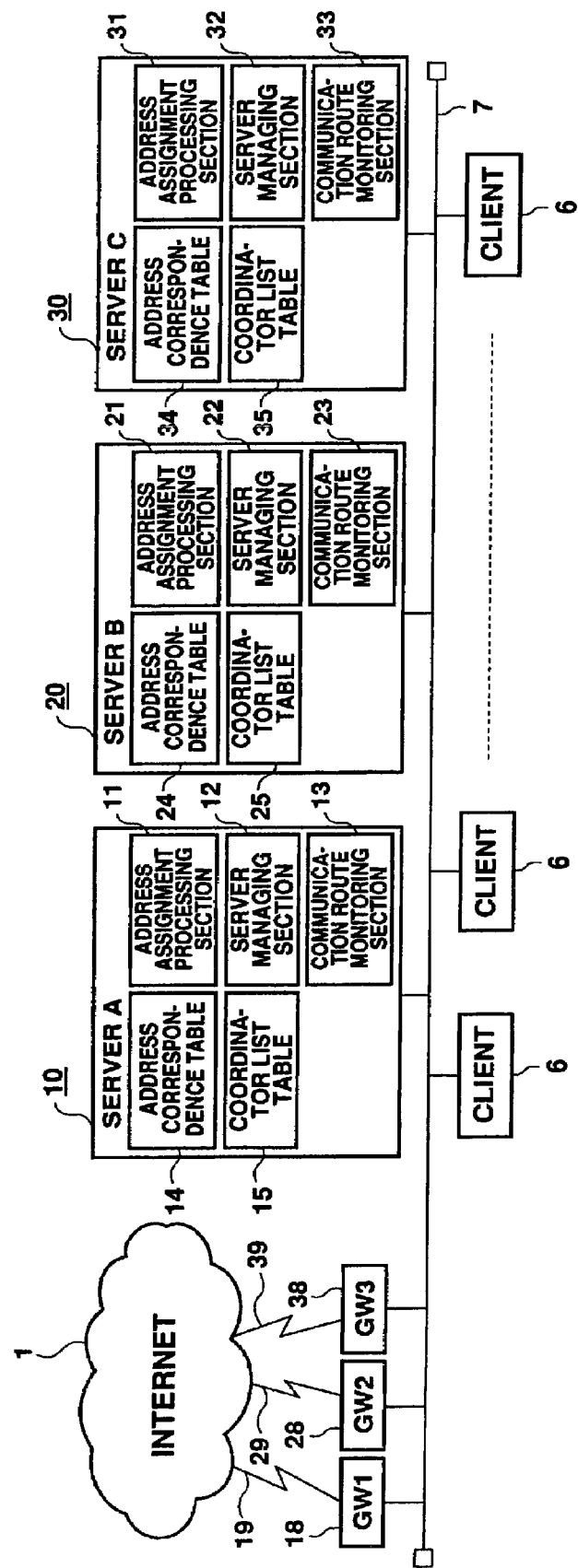
FIG. 5 is a structural block diagram showing another client-server system for practicing a method for assigning setting information for connection to an external network according to the present invention.

FIG. 5 is a structural block diagram showing another client-server system for practicing a method for assigning setting information for connection to an external network according to the present invention. A client-server system in a third embodiment differs from that in the above first and second embodiments in that the client-server system comprises a plurality of servers 10, 20, and 30. The servers 10, 20, and 30 have equivalent functions. The third embodiment will be described for an example configuration in which the server system is constructed by three servers 10, 20, and 30. However, the third embodiment is not limited to such a configuration, and the number of servers may be, for example, two or four or more. Also, in the shown example, the number of gateways 18, 28, and 38 are also set as three, but it is not necessary to match the number of gateways and the number of servers. The gateways 18, 28, and 38 can be any known gateway similar to the first and second embodiments.

Each of one or a plurality of clients 6 connected to the LAN 7 to which the server system is also connected accesses the Internet 1 via one of the gateways 18, 28, and 38 and one of the communication channels 19, 29, and 39. The client 6 may be any client which has a DHCP client function, and need not include functions specific to the third embodiment.

The function and structure of the servers 10, 20, and 30 will now be described. Because the servers 10, 20, and 30 have equivalent functions, the servers will be described using the server 10 as a representative server.

The server 10 comprises an address assignment processing section 11, a server managing section 12, a communication route monitoring section 13, an address correspondence table 14, and a coordinator list table 15. The address assignment processing section 11 executes, in response to an IP address assignment request from a client 6, an address assignment process in which an IP address or the like is assigned to the client 6. The server managing section 12 determines the single server for executing the address assignment process (hereinafter referred to as a "coordinator server"). The communication route monitoring section 13 monitors the conditions (whether or not connection is possible) of the network routes through gateway 18 and communication channel 19, through gateway 28 and communication channel 29, and through gateway 38 and communication channel 39, which are routed through when the client 6 accesses the Internet 1. A communication route monitoring section need not be provided for each of the servers 10, 20, and 30. It is also possible, for example, to configure such that the communication route monitoring section is provided in at least one server and the conditions of the network routes are notified to the other servers in which no communication route monitoring section is provided.

FIG. 6 is a diagram showing an example data structure of the address correspondence table 14 in the third embodiment. In addition to the data structure described in the first embodiment, the address correspondence table 14 in the third embodiment stores a server address correlated to each client 6. The server address is the address of the server which operates as the coordinator server for the client 6 and which has assigned the IP address to the client 6.

FIG. 7 is a diagram showing an example data structure of a coordinator list table 15 in the third embodiment. As will be described in more detail below, in the third embodiment, the coordinator server is determined based on predetermined criteria (which will be described below) employed between the server managing sections 12, 22, and 32 of the servers 10, 20, and 30 constituting the server system and the address assignment process is executed only by the address assignment processing section provided in the coordinator server. In the coordinator list table 15, the address of candidate servers that may operate as a coordinator server are registered. In the example data shown in FIG. 7, the addresses SA, SB, and SC of the servers 10, 20, and 30 are registered, and thus, any of the servers 10, 20, and 30 can operate as a coordinator server. Here, the coordinator list table 15 maybe preset, or, alternatively, may be set in real time by the server managing sections 12, 22, and 32 of active servers.

Because the server 10 in the third embodiment is characterized in the dynamic assignment function of IP address which is one function of a DHCP server, the server 10 is described as a DHCP server. However, the server may include functions such as, for example, functions of a DNS (Domain Name System) server and a DAP (Directory Access Protocol), in addition to the DHCP functions. Moreover, it is also possible to not separately provide a gateway server and to equip the server 10 with the gateway functions.

Figure 8:
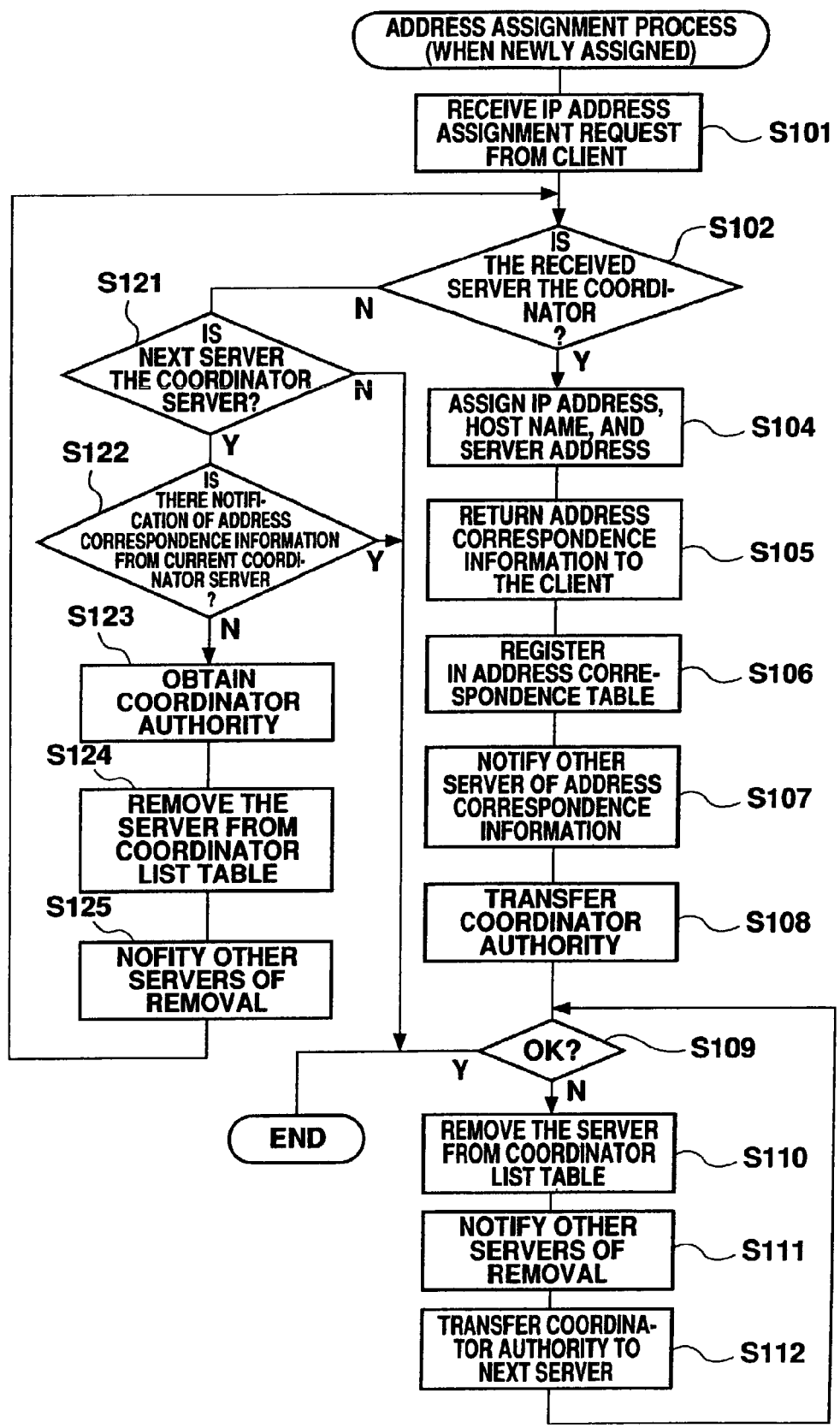
FIG. 8 is a flowchart showing a process for assigning an address (when newly obtained) to a client according to the third embodiment.

Next, the address assignment process to the client 6 according to the third embodiment will be described referring to the flowchart shown in FIG. 8. The address assignment process described with reference to FIG. 8 is a process when a client 6 newly obtains an IP address by broadcasting a DHCPDISCOVER message. The assignment process when the lease of the IP address is renewed by the client 6 transmitting a DHCPREQUEST message will be described later.

First, the client 6 broadcasts a DHCPDISCOVER message (IP address assignment request) to the servers 10, 20, and 30 in order to newly obtain an IP address. The server among the servers 10, 20, and 30 which is to receive the request is not yet determined, and thus, all the servers 10, 20, and 30 connected to the LAN 7 receives the request (step S101). However, in the third embodiment, only the coordinator server actually responds to the request, and all other servers do not normally execute any process, even when they receive the IP address assignment request (step S102).

In other words, all servers other than the coordinator server does not respond by a DHCPOFFER message. FIG. 8 also shows an exception handling (steps S121-S125) which will be described below. In the following, an example case will be described in which the server 10 is the current coordinator server. The method for determining the coordinator server will be described below.

The address assignment processing section 11 of the server 10 which recognizes itself as the coordinator server assigns an IP address or the like to the client 6 because there is no address correspondence information which corresponds to the client 6 who is the sender of the IP address assignment request is registered in the address correspondence table 14 (step S104). The process for producing setting information in this assignment is identical to that of the first and second embodiments and will not be described again in detail, except to note that, in the third embodiment, the address of the coordinator server must also be set in the address correspondence table 14. Thus, the address assignment processing section 11 sets the address SA of the server 10 as the coordinator server along with the IP address or the like and correlated with the client 6 and returns the setting information which includes the IP address assigned to the client 6, employed GW address, and server address to the client 6 (step S105). The address assignment processing section 11 then produces address correspondence information by correlating the assigned IP address, server address, and the address of the gateway as the base GW address and the employed GW address, to the MAC address of the client 6 and registers the address correspondence information to the address correspondence table 14 (step S106).

Through such address assignment process, the client 6 obtains an IP address or the like, and can then access the Internet 1 via one of the gateways 18, 28, and 38 set by the server 10.

In addition, the address assignment processing section 11 notifies the address correspondence information not only to the client 6, but also to the other servers 20 and 30 by broadcasting (step S107). Each of the servers 20 and 30 updates its own address correspondence table 24 or 34 using the received address correspondence information, so that the consistency of the data is maintained.

When this sequence of the address assignment process by the address assignment processing section 11 is completed, the server managing sections 12, 22, and 32 of the respective servers 10, 20, and 30 collaborate to execute a coordinator server circulation process to transfer the coordinator authority (assignment authority) (step S108). This process will be described in more detail below.

Figure 9:
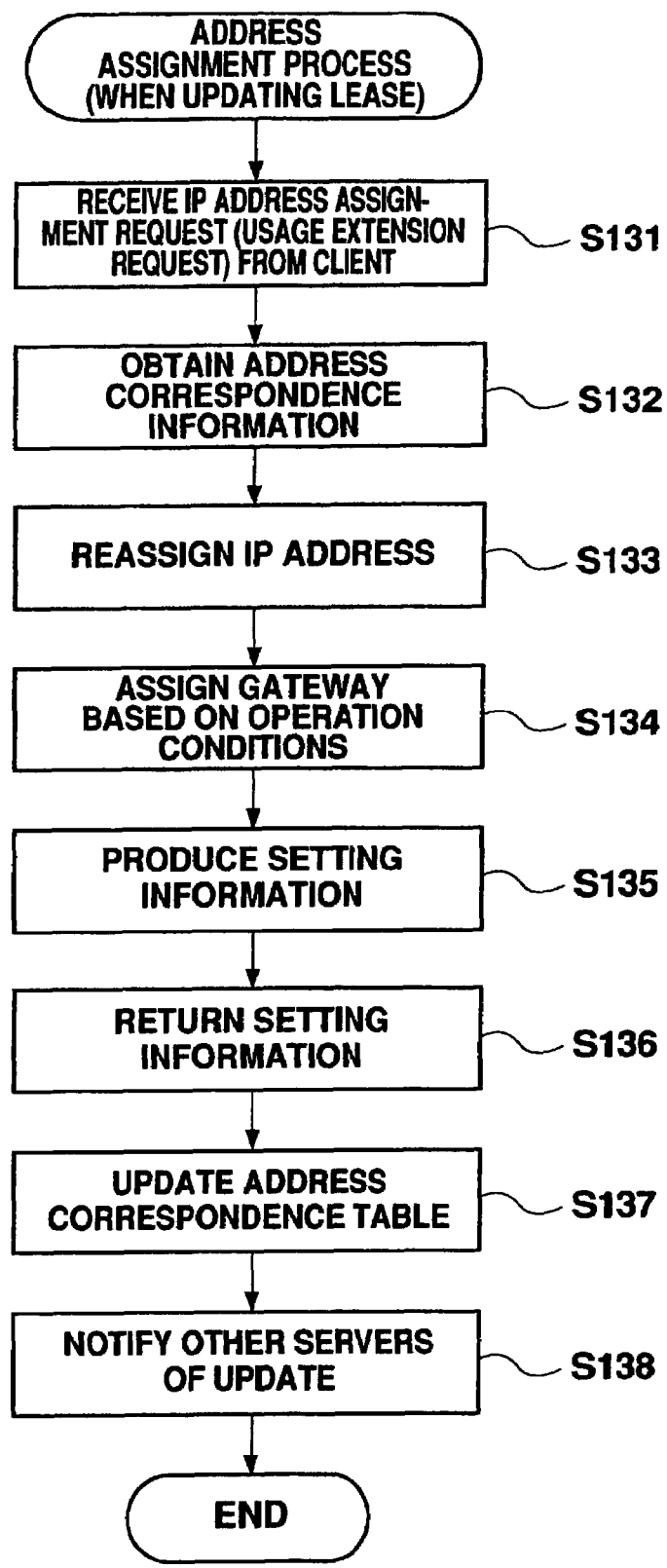
FIG. 9 is a flowchart showing a process for assigning an address to the client according to the third embodiment.

Next, an IP address assignment process when a client 6 transmits a DHCPREQUEST message to request extension of use of an IP address will be described referring to FIG. 9.

A DHCPREQUEST message (IP address assignment request) transmitted from the client 6 when requesting extension of use is not broadcasted, but rather, transmitted to the server which assigned the IP address. The address of the server is contained in the setting information received when the client 6 obtained the IP address. In the above described example case, for example, the server 10 receives the request (step S131).

The address assignment processing section 11 of the server 10, upon receiving the IP address assignment request from the client 6, analyzes the content of the IP address assignment request and identifies the sender. Then, the address assignment processing section 11 obtains the address correspondence information of the corresponding client 6 from the address correspondence table 14 (step S132) and reassigns the IP address which has been assigned to the client 6 (step S133) Further, the address assignment processing section 11 queries the communication route monitoring section 13 of the operation conditions of the gateways and assigns the gateway to be used (step S134). This process of assigning the gateway to be used is identical to that in the first embodiment, and will not be described again. In summary, if the base GW address is operating normally, the base GW address is assigned, and, if, on the other hand, the base GW address is in a condition where it cannot be used, a substitute GW address is assigned. The address assignment processing section 11 then produces setting information (step S135) and returns the setting information to the client 6 (step S136). Similar to the first embodiment, the lease periods set in the setting information for the base gateway and for the substitute gateway are set to differ from each other. Then, the address assignment processing section 11 produces address correspondence information by correlating the reassigned IP address or the like to the MAC address of the client 6, updates the address correspondence table 14 (step S137), and notifies the other servers 20 and 30 of the update (step S138). In this process, it can be considered that change is only possible in the employed GW address, and, thus, the update of the data other than the employed GW address is merely an overwrite by the same data.

As described, according to the third embodiment, the client 6 can repeatedly use the IP address which is once assigned, failures that may occur when the IP address is dynamically switched can be avoided.

During this process, there is also a possibility that, for some reasons, the server which is to receive the DHCPREQUEST message (IP address assignment request) transmitted from the client 6 is shutdown. In this case, the client 6 judges, from the fact that there is no response from the server, that the message cannot reach the server for reasons such as, for example, the server being shutdown, and broadcasts the DHCPREQUEST message.

A server having the coordinator authority or the server about to take the coordinator authority responds to the broadcasted DHCPREQUEST message. In this example case, if the server 20 is assumed to respond, the server 20 executes the reassignment process of IP address in place of the server 10. This assignment process is identical to the process described above (steps S132-S138) and will not be described again in detail, except to note that the address SB of the server 20 is written as the server address in the address correspondence table 14, in preparation of a DHCPREQUEST message transmitted for another extension of use of the IP address. For the update of the server address, similar to the GW address, it is also possible to configure such that a base server address and a substitute server address are set.

A method for determining the coordinator server will now be described referring to FIG. 8.

In FIG. 8, the server managing section 12 of the server 10 which is the coordinator server refers to the coordinator list table 15 and transfers the coordinator authority which indicates that the server is the coordinator server, to a server (in this example case, server 20) listed in the table 15 following the server itself (in this example case, server 10), or, alternatively, if the server itself is listed as the last server, to the first server in the list (step S108). More specifically, the servers exchange messages that indicate the transfer of coordinator authority. The new coordinator server, server 20, operates as a coordinator server according to the flow shown in FIG. 8. The performed process is identical to that performed by the server 10 described above. On the other hand, the server 10, which is no longer a coordinator server, now executes processes similar to the processes executed by the servers 20 and 30 described above, that is, the server 10 in general does not perform any process for the received DHCPDISCOVER message (IP address assignment request).

As described above, in the address assignment process of the third embodiment, when an IP address assignment process is executed by the coordinator server, the coordinator server registers itself in the address correspondence table 14 as the coordinator server. Then, each time the process is completed, the coordinator authority is sequentially transferred according to the coordinator list table 15. Because of this, the number of clients that each of the servers 10, 20, and 30 must handle becomes approximately equal. In other words, as described in the first embodiment, by employing the coordinator server circulation scheme, it is possible to realize distribution of load. In addition, because normal transfer is only possible when both the sender and receiver of the coordinator authority is normally operating, this transfer function of coordinator authority also acts as a server alive function. The process when an abnormality occurs in the sender or the receiver of the coordinator authority will now be described.

First, in step S108, if the receiver does not receive the coordinator authority in a predetermined period because of reasons such as, for example, the receiver is stopped (step S109), the server managing section 12 of the coordinator server removes the address of the server 20 from the coordinator list table 15 (step S110) and notifies a server 30 other than the server 20 of the removal by broadcasting (step S111). Upon receiving this notification, the server 30 removes the address of the server 20 from its own coordinator list table 35 so that consistency in data is maintained. Then, the server managing section 12 transfers the coordinator authority which indicates that the server is the coordinator server to the next server in the list (in this example case, server 30) (step S112). By repeating this process, the server to become the next coordinator server is found.

On the other hand, there is also a possibility that the server which became the coordinator server by receiving the coordinator authority is stopped for some reason. While this state remains, there will be no server for processing the DHCPDISCOVER message transmitted from the client 6. To this end, in the third embodiment, a server which is scheduled to become the next coordinator server executes the following process, even though this server is not a coordinator server.

That is, in FIG. 8, the server which is scheduled to be the next coordinator server can be identified in advance by referring to the coordinator list table 15 (step S121). When the notification that is normally transmitted from the coordinator server in step S107 is not transmitted in a predetermined period after the DHCPDISCOVER message is received (step S122), the server scheduled to be the next coordinator server (for example, server 20) judges that a failure has occurred in the coordinator server.

When the server 20 judges that the coordinator server is inoperable as described above, the server 20 itself acquires the coordinator authority and becomes the coordinator server (step S123) The server 20 removes, from the coordinator list table 15, the server 10 in which a failure occurred (step S124) and notifies the server 30 other than the server 10 of the removal by broadcasting (step S125). The new coordinator server 20 operates as the coordinator server according to the flow shown in FIG. 8.

In this manner, each client 6 can access the Internet 1 using the IP address and GW address set by the server 10. When the client 6 finishes accessing the Internet 1, the IP address is recovered according to DHCP.

Figure 10:
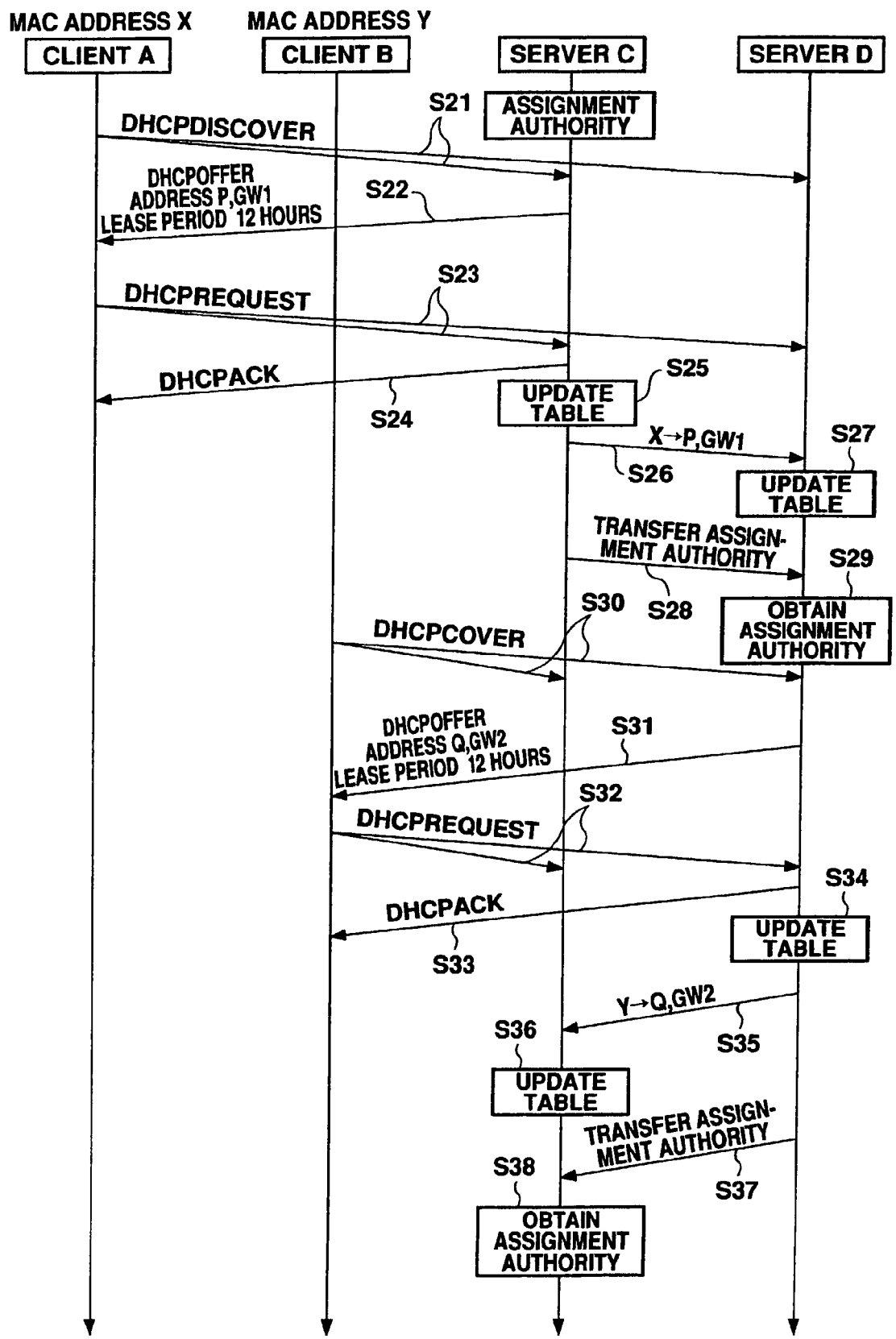
FIG. 10 is a sequence diagram showing transfer of the assignment authority according to the third embodiment.

The transfer of the coordinator authority will now be described referring to the drawings. FIG. 10 is a sequence diagram showing transfer of the coordinator authority (assignment authority) performed during the IP address assignment processing described above. FIG. 10 shows two clients A and B respectively having a MAC address of X and Y, and two servers C and D. It is assumed that at the initial stage of this process, the server C has the assignment authority. The contents of the process overlap those shown in FIG. 8.

When the client A broadcasts an IP address assignment request (DHCPDISCOVER message) (step S21), the server C which has the assignment authority produces setting information in response to the request and transmits the produced setting information (DHCPOFFER message) to the client A (step S22). The process of production of the setting information is identical to that described above. After the setting information is received, the information of a DHCPREQUEST message and information of a DHCPACK are exchanged (steps S23 and S24). The client A is then registered in the address correspondence table (step S25). The registration is notified to each server (step S26), and the server D, upon receiving the notification, updates its own address correspondence table (step S27). When the assignment process as the coordinator server is completed as described, the server C transfers, by referring to the coordinator list table, the assignment authority to the server D (step S28). The server D which is normally operating obtains the assignment authority transferred from the server C (step S29).

Then, the server D, upon receiving an IP address assignment request (DHCPDISCOVER message) broadcasted by the client B, assigns an IP address through processes similar to steps S21-S24 (steps S30-S33), updates the address correspondence tables of the servers C and D through processes similar to steps S25-S27 (steps S34-S36), and transfers the assignment authority to the next server through processes similar to steps S28 and S29 (steps S37 and S38).

Figure 11:
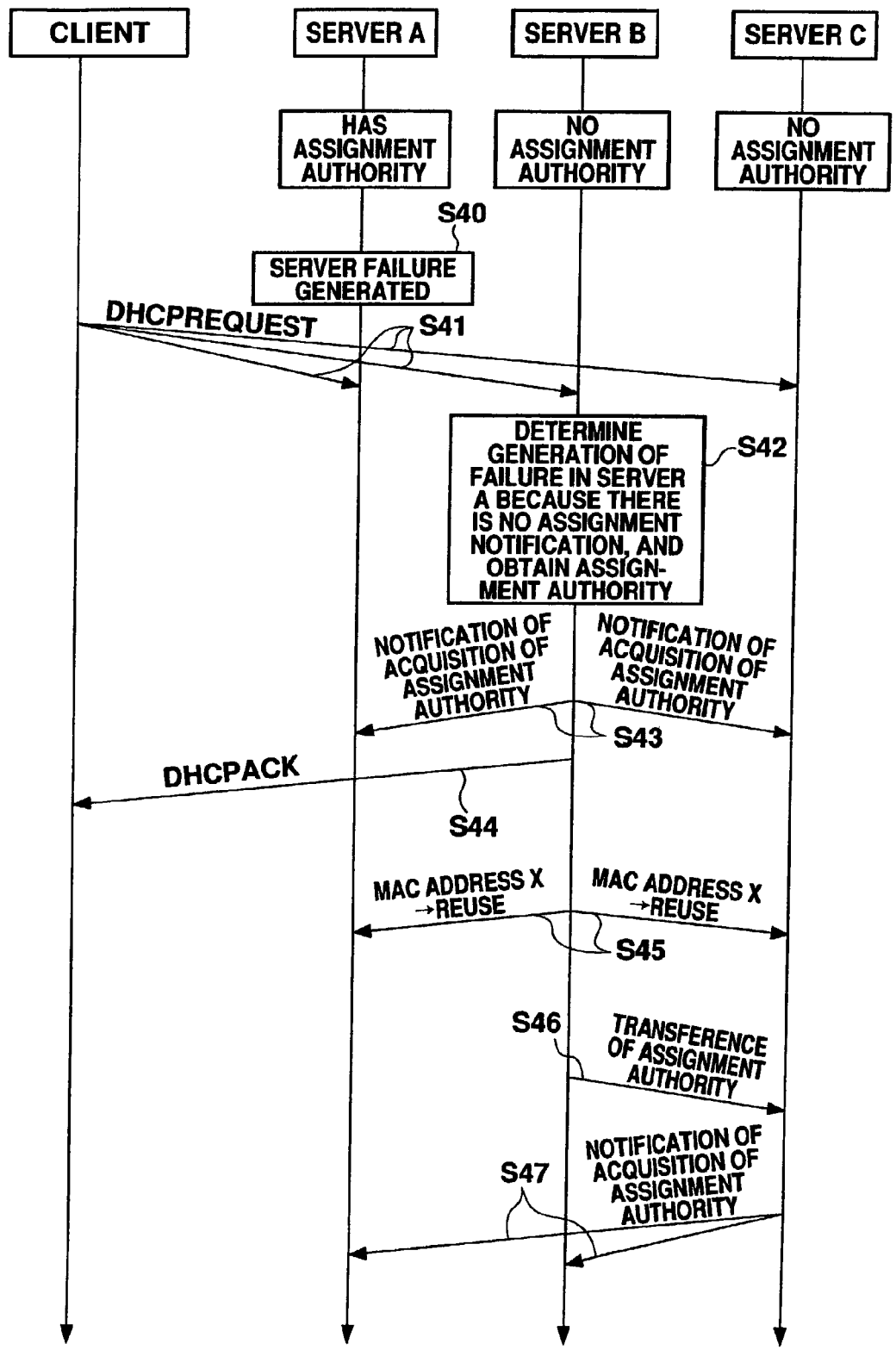
FIG. 11 is another sequence diagram showing transfer of the assignment authority according to the third embodiment.

FIG. 11 is a sequence diagram showing transfer of assignment authority when the coordinator server is stopped. In FIG. 11, as the content of the setting information is identical to that described above, it is not shown. Referring to FIG. 11, when a client broadcasts an IP address assignment request (DHCPDISCOVER message) (step S41), a server A having the assignment authority would have to transmit the setting information (DHCPOFFER message) in response to the request. However, because the server A is stopped due to a failure generated in the server A after the server A has obtained the assignment authority (step S40), the server A cannot respond to the request. Therefore, because there is no assignment notification from the server A in a predetermined period, a server B which is to become the coordinator server next acquires the assignment authority (step S42), notifies the other servers of the acquisition (step S43), and responds to the client A (step S44). Then, the server B notifies the other servers of the completion of the handling of the client (step S45) and transfers the assignment authority to the next server C (steps S46 and S47). The process is basically the same for the case when an IP address is newly obtained. This process is already described referring to steps S121-S125 in FIG. 8.

Figure 12:
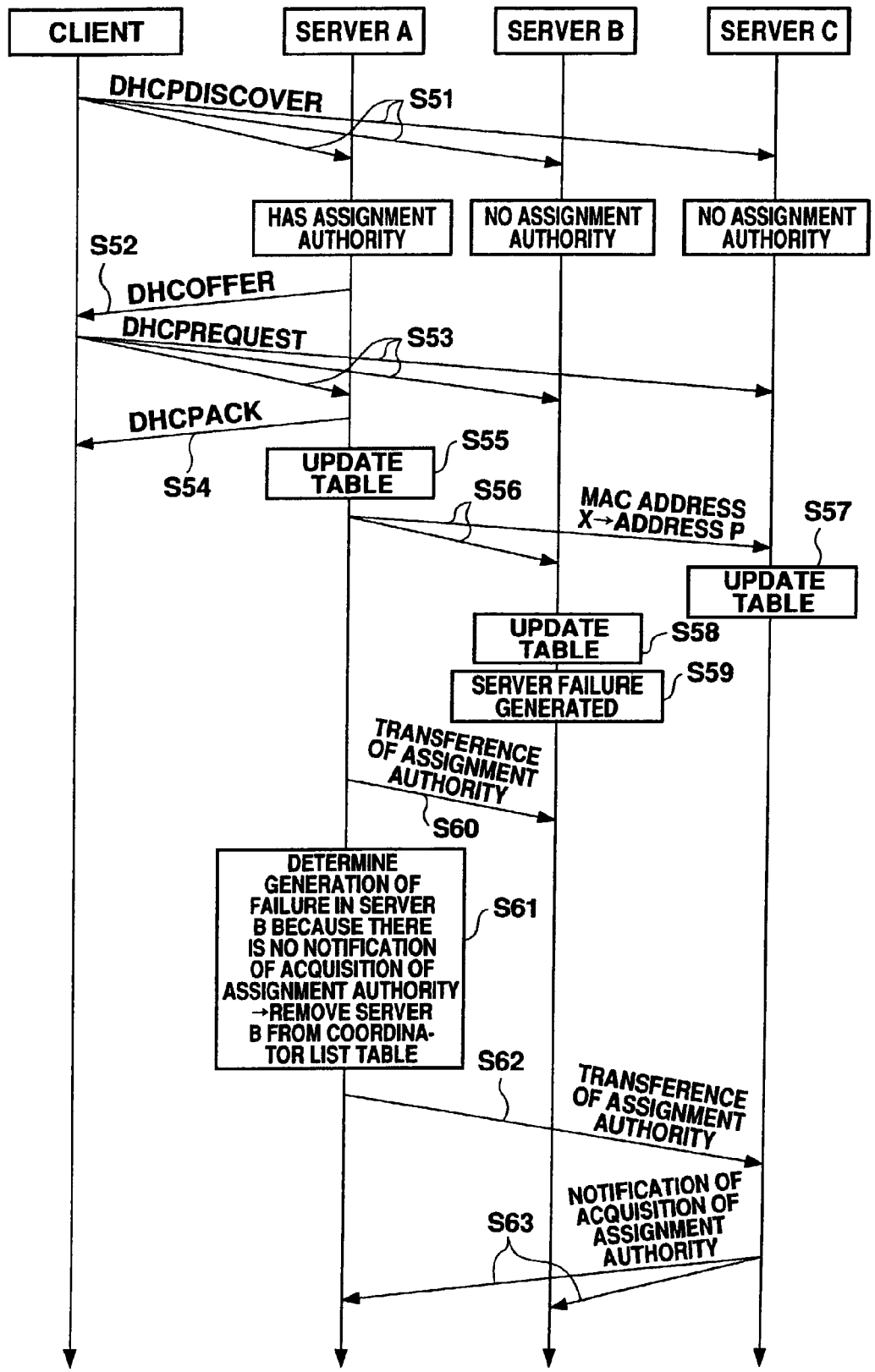
FIG. 12 is yet another sequence diagram showing transfer of the assignment authority according to the third embodiment.
Figure 13:
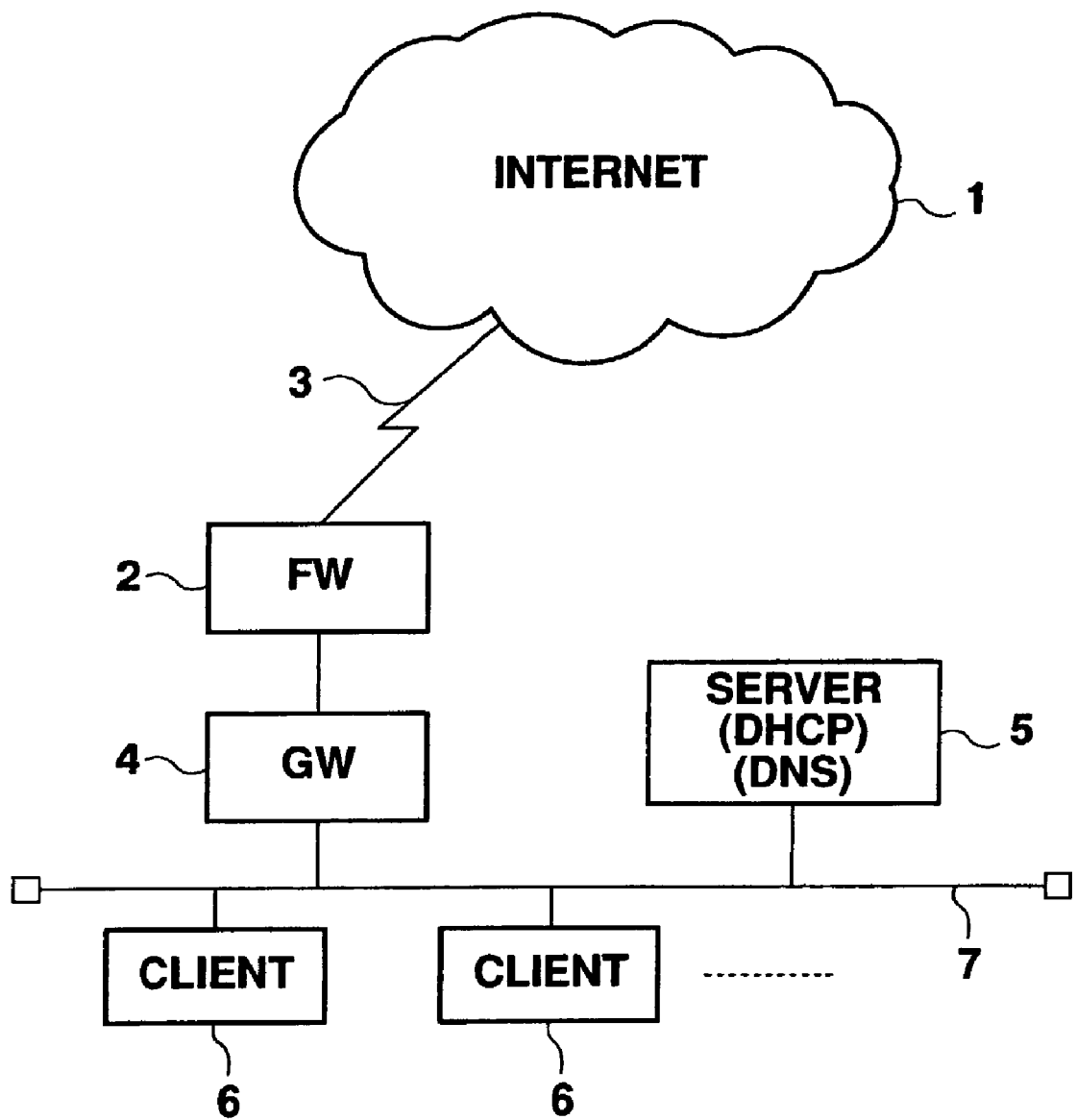
FIG. 13 is a structural block diagram showing a conventional server system.

FIG. 12 is a sequence diagram showing an example wherein the server B which is to obtain the assignment authority next is stopped immediately after the assignment process by the server A which had the assignment authority. This process corresponds to steps S110-S112 in FIG. 8. The process from reception of an IP address assignment request (DHCPDISCOVER message) from a client till the assignment of the IP address for the client (steps S51-S58) are described above and will not be described again.

The server A attempts to transfer the assignment authority, according to the coordinator list table, to the server B to which the assignment authority is to be transferred (step S60). However, because there is no response from the server B, the server A determines that a failure is generated in the server B and removes the server B from the coordinator list table (step S61). Then, the server A refers to the coordinator list table, identifies the next server to receive the assignment authority, and attempts to transfer the assignment authority to the server C (step S62). As a result, when the server C obtains the assignment authority, the server C notifies the other server of the acquisition (step S63).

Because the configuration of the third embodiment is such that multiple communication routes for connecting the clients 6 and the Internet 1 are provided and the communication route to be used by each client 6 is dynamically determined and connected, it is possible for the client 6 to continue accessing the Internet 1 by switching the communication route, even when an abnormality occurs in any of the gateways 18, 28, and 38 on the network route.

In the third embodiment, a coordinator server circulation process is performed also to realize a keep alive function of the servers. However, if the load distribution for the network connection processes is the only concern, it is also possible to set a certain server as the coordinator server to respond to all IP address assignment requests. In this configuration, the coordinator server designates a server for actually executing the assignment process. In the event where the certain server is stopped, the coordinator server can be switched to another server. In other words, it is not required to employ a coordinator server circulation scheme as described in the third embodiment.

Although in the third embodiment, the distribution of the load is effected by simply circulating the servers, it is also possible to actually measure and compare the loads placed onto the servers 10, 20, and 30, and to distribute the client 6 to a server having a low load.

In the third embodiment, the address correspondence tables 14, 24, and 34 and coordinator list tables 15, 25, and 35 are separately provided for each of the servers 10, 20, and 30, so that the notification for maintaining consistency of data is also used as a keep alive function. However, if any other method is employed for realizing the keep alive function, it is also possible to provide a database server or the like and use a common database for these tables.

In the above description, only the removal from the coordinator list table of the server in which a failure is generated is explained, but the server managing section 12, 22, and 32 also operates, when the server is restored, to reregister the address in their respective coordinator list tables 15, 25, and 35 and to notify the other servers, so that the restored server can again function as a coordinator server.

In addition, it is also possible to provide management tables for the gateways 18, 28, and 38 similar to the coordinator list table 15 to manage the availability of the gateways.

What is claimed is:

1. A method for assigning, to a client, setting information for connection to an external network in response to an assignment request from the client to be connected to the external network via one of a plurality of gateways, the method executed by a DHCP server and the setting information including at least locating information of the gateway, the method comprising the steps of:

analyzing the received assignment request from the client; and producing and assigning to the client which transmitted the assignment request, when connection to the external network via a base gateway which is already assigned as a gateway to be used in normal cases is not possible, setting information including identification information of an alternative gateway different from the base gateway and a lease period which is shorter than a base lease period for address for communication which is set along with the base gateway.

2. A method for assigning setting information for connection to an external network according to claim 1, further comprising a reassignment step for producing and assigning to the client which transmitted the assignment request, when the client is using the alternative gateway and the communication route to the external network via the base gateway assigned to the client is restored, setting information which includes identification information of the base gateway and base lease period.

3. A method for assigning setting information for connection to an external network according to claim 1, further comprising the step of transmitting to the client the setting information assigned to the client.

4. A method for assigning setting information for connection to an external network according to claim 1, further comprising the step of notifying, upon detecting that connection to the external network via a gateway is not possible, the unavailability of network connection to at least the client having the gateway as the base gateway, and wherein in the step for assigning, setting information to be assigned to the client is produced in response to an assignment request transmitted from the client in response to the notification in the step for notifying.

5. A method for assigning setting information for connection to an external network according to claim 2, further comprising the step of notifying, upon detecting that the communication route is restored so that connection to the external network is possible via the gateway, the restoration of the network to at least the client having the gateway as the base gateway, and wherein in the reassignment step, setting information to be assigned to the client is produced in response to an assignment request transmitted from the client in response to the notification in the step for notifying.

* * * * *